April 29, 1930.  M. MILLION  1,756,375
LOLLYPOP MACHINE
Filed Dec. 22, 1928  3 Sheets-Sheet 1

April 29, 1930.     M. MILLION     1,756,375
LOLLYPOP MACHINE
Filed Dec. 22, 1928     3 Sheets-Sheet 2
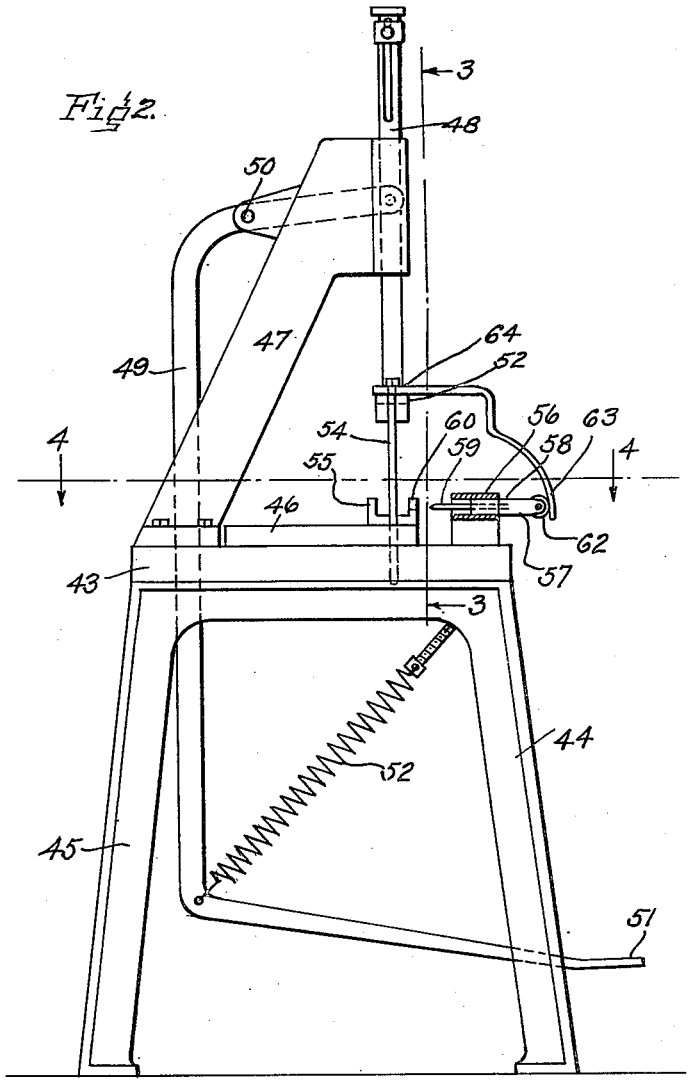
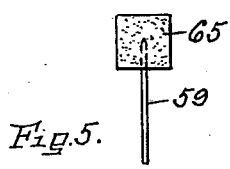
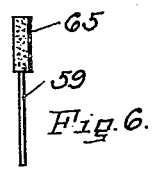
Inventor
Morris Million
By his Attorney April 29, 1930.    M. MILLION    1,756,375
LOLLYPOP MACHINE
Filed Dec. 22, 1928    3 Sheets-Sheet 3

Inventor
Morris Million
By his Attorney
George C. Heinicke

Patented Apr. 29, 1930

1,756,375

UNITED STATES PATENT OFFICE

MORRIS MILLION, OF BROOKLYN, NEW YORK

LOLLIPOP MACHINE

Application filed December 22, 1928. Serial No. 327,883.

This invention relates to improvements in machines for making candy, and particularly to a machine for making a confection called lollipops, and it is the principal object of the invention to provide a machine for shaping and forming the lollipops in one operation.

Another object of my invention relates to a machine for making lollipops preferably of square form or contour which is simple in its construction and therefore comparatively inexpensive to manufacture and one which allows the manufacture of a plurality of lollipops in one operation.

A further object of the invention is the provision of a lollipop machine in which the sticks are attached to a plurality of lollipops simultaneously with the making of the confection.

A still further object of my invention is the provision of a lollipop making machine of this type which is preferably operated by foot power which however can readily be changed into a motor operated machine.

These and other objects and advantages of my invention will become more fully apparent as the description thereof proceeds, and will then be specifically defined in the appended claim.

In the accompanying drawings forming a material part of this disclosure:

Fig. 2 is a side elevation of a modified form of my invention.

Fig. 5 is a front elevation of a finished lollipop, and

Fig. 6 is an end view thereof.

Figure 1:
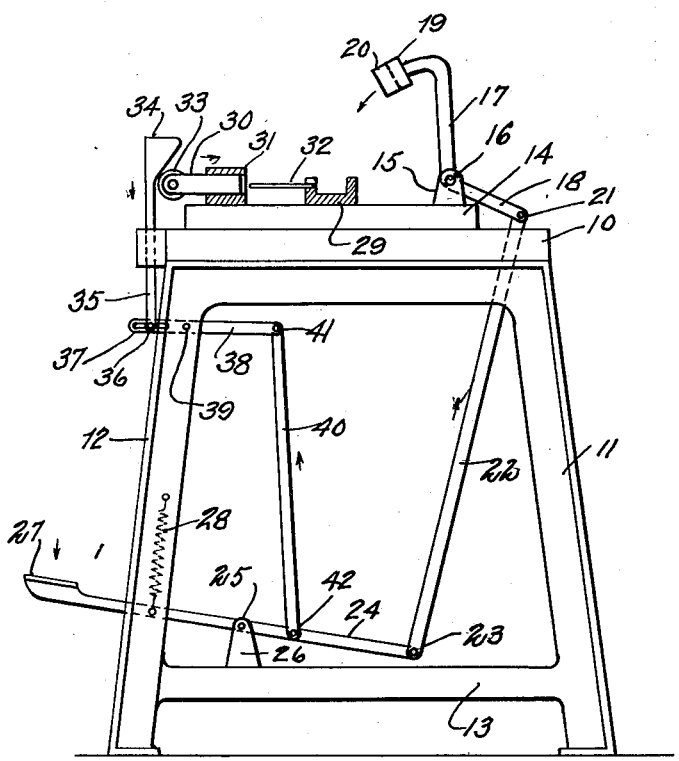
Fig. 1 is a side elevation of a machine for making lollipops, constructed according to my invention.
Figure 3:
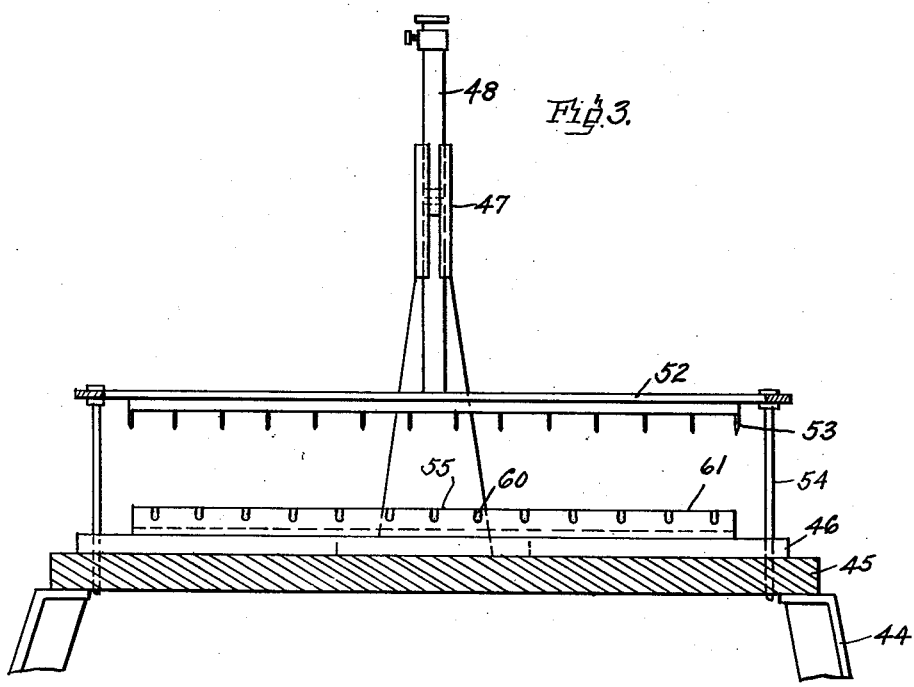
Fig. 3 is a front elevation thereof seen in the direction of arrows 3—3 of Figure 2.
Figure 4:
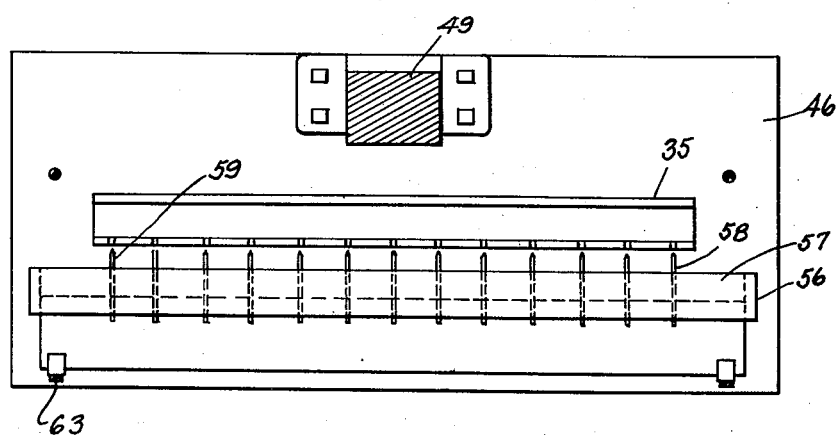
Fig. 4 is a top plan view of the machine, seen in the direction of line 4—4 of Figure 2.

As illustrated in Figure 1, my machine comprises a table 10 supported by pairwise arranged feet 11 and 12 connected by a cross beam 13. The table 10 supports a platform 14 carrying at its rear a bracket 15 in which is fulcrumed, as at 16, the apex of a bell-crank lever 17, 18. The upper forwardly and downwardly bent arm of this lever carries a knife holder 19 in which a plurality of knives 20, preferably of square contour, are suitably held. The outer end of arm 18 of the bell-crank lever has pivotally attached thereto, as at 21, the upper end of an operating rod 22 to the lower end of which is pivotally secured intermediate its ends, as at 25, on a lug 26 or the like on cross-beam 13, and the outer end of bar 24 is formed into a treadle 27, while a spring 28 secured at one end to bar 24 and at its other end to leg 12 of the machine frame tends to normally hold the treadle in its elevated position.

The candy is placed into a trough 29 substantially U-shaped in cross-section and arranged on top of platform 14 in such a position that the knives 20 upon their swinging down will cut the material into the desired size of lollipops.

It will be clear that the knives may have any suitable contour and may be made exchangeable, so as to allow a ready exchange of worn or broken blades.

The sticks are attached to the lollipops simultaneously with the cutting operation by the following mechanism:

A plate 30 is slidably guided in a guide 31, and is provided with a plurality of transverse channels adapted for the reception of the sticks 32.

The front edge of plate 30 carries a roller 33 or the like adapted to be engaged by an operating member 34 having a form as for instance illustrated in Figure 1 and a downwardly directed stem 35 carrying at its ends a cross-pin 36 adapted to enter and slide within a longitudinal slot 37 in the outer end of a lever 38 pivotally attached intermediate its ends, as at 39, to a leg 12, while to its inner end, the upper end of a bar 40 is pivotally attached, as at 41, the lower end of which is pivotally attached to bar 24 behind its pivot point 25.

The machine operates as follows:

The operator presses treadle 27 down with the foot, thus moving rod 22 upwardly in the direction of the arrow, which will swing bell-crank lever 17, 18 about its fulcrum and bring the knives 20 down against the material in trough 29 and separate the same into pieces of the size and form of lollipops desired to manufacture. Simultaneously, the bar 40 will also move upwardly and by the intermediary of lever arm 38 carry member 34 down so that its operating face will engage roller 33 and will guide the plate 30 and sticks 32 inwardly and press the latter through slots in the U-trough into the candy or lollipops while vertical slots in the trough wall will allow a convenient lifting of the ready lollipops and sticks attached thereto from the machine.

In the form of my invention illustrated in Figures 2 to 6, the table is supported by pairwise arranged feet 44, 45 and in turn supports a platform 46, and a frame or guide 47 for a plunger 48. An operating element or lever 49 for plunger 48 is pivoted as at 50, near its upper end to the guide or bearing 47, while its lower end is curved and projects from the front of the machine to form a foot operated pedal 51, while a spring 52 is secured to one of the feet 44 and to the curved part of lever 49 for drawing the same back into its normal position after each operation of the foot pedal 51.

The lower end of plunger 48 carries a plate 52 constituting a holder for a plurality of knives 53 preferably square and exchangeably held in plate 52.

A pair of posts 54, guide plate 52 during its up and down movements, and a trough 55 of preferably U-shaped cross-section is adapted to receive the material for the lollipops and is arranged below the knives on platform 46.

The table 43, carries also near its front a guide 56 for a board or plate 57 having a plurality of transverse grooves 58 formed therein for the sticks 59 adapted to be pressed into the material in trough 55 through openings 60 in the front wall of the trough, while vertical recesses 61 allow a convenient removal of the stick with the lollipops thereon from trough 55.

The front edge of plate 57 carries a roller 62 engaged by a member 63 of a configuration best shown in Figure 2, the upper horizontal branch 64 of which is attached to the plunger above the knife plate.

The lollipop 65 illustrated as example in Figures 5 and 6 has preferably square form but it will be understood that the same may have any other desired shape or thickness etc.

The machine as illustrated in Figures 2 to 6 operates as follows:

Upon the depression of treadle 51 by foot or any other power, the plunger will be carried downwards and the knives will cut the material in the trough into suitably shaped lollipops, while simultaneously the member 63 will engage roller 62 and press plate 57 with the sticks 58 thereon into engagement with the lollipops in trough 55, whereafter sticks and lollipops can be conveniently removed from the machine and the parts will return into their original normal positions upon the release of pedal 51 by the action of spring 52.

It will be understood that I have described and shown the preferred forms of my machine only as examples of the many ways to practically construct the same, and that I may make such changes in its general arrangement and in the construction of the minor details thereof as come within the scope of the appended claim without departure from the spirit of my invention and the principles involved.

Having thus described my invention, what I claim as new and desire to secure by Letters Patent is:

A lollipop making machine comprising a table, a platform carried by said table and supporting a bracket, a bell-crank lever having its apex fulcrumed on said bracket, a knife holder carried by the upper end of the forwardly and downwardly bent arm of said bell-crank lever, a plurality of knives held in said holder, an operating lever pivoted to the lower end of the other arm of said bell-crank lever, a foot operated lever for moving said operating lever upward to lower said knives, a substantially U-shaped trough on said platform within the path of said knives, adapted to receive the candy, to be cut upon the lowering of said knives, said trough having a plurality of slots in its front wall allowing the introduction of sticks to be combined with the cut candy in said trough and lifting therefrom, a sliding plate having a plurality of transverse channels formed therein for the reception of the sticks, a guide for said plate, a roller carried by the front edge of said plate, and an operating member having a cam face wider on top and narrow below adapted to engage upon its downward movement the roller to move said plate forward and press the sticks thereon into the candy in said trough, a downwardly directed stem on said member, and a means for connecting said stem with the foot operated lever allowing a feeding of the sticks against the candy simultaneously with the operation of the knives for emebdding the sticks into the candy after cutting the same by said knives.

Signed at New York, in the county of New York and State of New York, this 19th day of December, A. D. 1928.

MORRIS MILLION.